(12) United States Patent
Yamato

(10) Patent No.: US 10,164,862 B2
(45) Date of Patent: Dec. 25, 2018

(54) COMMUNICATION SYSTEM, CONTROL DEVICE, COMMUNICATION METHOD AND PROGRAM

(75) Inventor: Junichi Yamato, Tokyo (JP)

(73) Assignee: NEC CORPORATION, Tokyo (JP)

(*) Notice: Subject to any disclaimer, the term of this patent is extended or adjusted under 35 U.S.C. 154(b) by 196 days.

(21) Appl. No.: 13/991,140

(22) PCT Filed: Sep. 9, 2011

(86) PCT No.: PCT/JP2011/005084
§ 371 (c)(1),
(2), (4) Date: May 31, 2013

(87) PCT Pub. No.: WO2012/073406
PCT Pub. Date: Jun. 7, 2012

(65) Prior Publication Data
US 2013/0242879 A1 Sep. 19, 2013

(30) Foreign Application Priority Data
Dec. 2, 2010 (JP) .................................. 2010-269164

(51) Int. Cl.
*H04L 12/701* (2013.01)
*H04W 40/20* (2009.01)

(52) U.S. Cl.
CPC ............ *H04L 45/00* (2013.01); *H04W 40/20* (2013.01)

(58) Field of Classification Search
None
See application file for complete search history.

(56) References Cited

U.S. PATENT DOCUMENTS 7,555,542 B1  6/2009 Ayers et al.
7,937,438 B1* 5/2011 Miller et al. ................ 709/203
(Continued)

FOREIGN PATENT DOCUMENTS

CN    1620044 A   5/2005
CN  101001468 A   7/2007
(Continued)

OTHER PUBLICATIONS

Russian Office Action dated Dec. 1, 2014 with an English translation thereof.
(Continued)

Primary Examiner — Alex Skripnikov
(74) Attorney, Agent, or Firm — McGinn I.P. Law Group, PLLC

(57) ABSTRACT

A communication system includes: a plurality of nodes each of which forwards a packet; a terminal device to establish a connection with at least one of the nodes, and to access a network through at least one of the nodes; and a control device to control a packet forwarding route in response to a request which is sent from at least one of the nodes to request for setting the packet forwarding route. The control device includes: a unit that stores a plurality of location information respectively corresponding to the respective nodes; a unit that receives the request sent from at least one of the nodes connected to the terminal device; and a unit that identifies a location of the terminal device based on the location information corresponding to the at least one of the nodes, and controls the packet forwarding route by using the location of the terminal device.

27 Claims, 19 Drawing Sheets

(56) References Cited

U.S. PATENT DOCUMENTS

| | | | |
|---|---|---|---|
| 8,224,971 B1* | 7/2012 | Miller et al. | 709/227 |
| 8,605,622 B2 | 12/2013 | Shimonishi | |
| 8,837,286 B2 | 9/2014 | Mizukoshi | |
| 9,083,609 B2 | 7/2015 | Casado et al. | |
| 2001/0028647 A1 | 10/2001 | Teraoka | |
| 2003/0210694 A1* | 11/2003 | Jayaraman et al. | 370/392 |
| 2005/0018645 A1* | 1/2005 | Mustonen | H04L 29/12311 370/349 |
| 2007/0280192 A1* | 12/2007 | Yagyu et al. | 370/349 |
| 2008/0215681 A1* | 9/2008 | Darcie et al. | 709/204 |
| 2008/0228926 A1* | 9/2008 | Shiratzky et al. | 709/228 |
| 2009/0086734 A1 | 4/2009 | Nandagopal et al. | |
| 2009/0138577 A1 | 5/2009 | Casado et al. | |
| 2011/0261825 A1 | 10/2011 | Ichino | |
| 2011/0286342 A1* | 11/2011 | Ee et al. | 370/252 |
| 2011/0286359 A1 | 11/2011 | Shimonishi | |
| 2011/0310734 A1* | 12/2011 | Mizukoshi | 370/231 |
| 2012/0044813 A1* | 2/2012 | Nandagopal et al. | 370/242 |
| 2012/0131222 A1* | 5/2012 | Curtis | H04L 47/2441 709/235 |
| 2016/0013969 A1 | 1/2016 | Casado et al. | |

FOREIGN PATENT DOCUMENTS

| | | |
|---|---|---|
| CN | 101836461 A | 9/2010 |
| JP | 11-41285 A | 2/1999 |
| JP | 2001-268129 A | 9/2001 |
| KR | 10-2009-0032193 A | 4/2009 |
| WO | WO 01/90911 A1 | 11/2001 |
| WO | WO 2007/077958 A1 | 7/2007 |
| WO | WO 2009/042919 A2 | 4/2009 |
| WO | WO 2010/090182 A1 | 8/2010 |
| WO | WO 2010/103909 A1 | 9/2010 |
| WO | WO 2010/110235 A1 | 9/2010 |
| WO | WO 2011/049019 A1 | 4/2011 |

OTHER PUBLICATIONS

International Search Report (ISR) (PCT Form PCT/ISA/210) dated Oct. 11, 2011, in PCT/JP2011/005084.
Korean Office Action dated May 30, 2014 with a partial English translation thereof.
Chinese Office Action dated Aug. 5, 2015 with an English translation thereof.
Japanese Decision to Grant a Patent dated Feb. 14, 2017 with a partial English translation thereof.
Japanese Office Action dated Nov. 22, 2016 with a partial English translation thereof.
Hideyuki Shimonishi et al., "OpenFlow Switching Technology and Its Applications to Mobile Networks", IEICE Technical Report, MoMuC, Mobile Multimedia Communications, The Institute of Electronics, Information and Communication Engineers, Jan. 14, 2010, vol. 109, No. 380, p. 57-62.
Extended European Search Report dated Sep. 20, 2016.
Murtaza Motiwala et al: "A Narrow Waist for Multipath Routing", Techrepublic, Oct. 1, 2009 (Oct. 1, 2009), XP055159726, pp. 4 and 11-12.
Mysore R N et al: "Portland: a scalable fault-tolerant layer 2 data center network fabric", Proceedings of the ACM Sigcomm 2009 Conference on Data Communication; Aug. 17-21, 2009; Barcelona, Spain, ACM, New York, NY, USA, Aug. 17, 2009 (Aug. 17, 2009), pp. 39-50, XP008134413, ISBN: 978-1-60558-594-9, p. 40-p. 47.

* cited by examiner

Fig. 8

| FILE NAME | ATTRIBUTE | OBJECT ID | DEPLOYMENT POLICY |
|---|---|---|---|
| | | | |

Fig. 9

| OBJECT ID | STORAGE ID 1, STORAGE ID 2, ...., STORAGE ID n |
|---|---|

COMMUNICATION SYSTEM, CONTROL DEVICE, COMMUNICATION METHOD AND PROGRAM

TECHNICAL FIELD

Description of Related Application

The present invention is based upon and claims the benefit of the priority of Japanese Patent Application No. 2010-269164 (Dec. 2, 2010), the disclosure of which is incorporated herein in its entirety by reference thereto. The present invention relates to a communication system, a control device, a communication method and program, and in particular, relates to a communication system, a control device, a communication method and a program that perform setting of a packet forwarding route in a network.

Background

Accompanying the spread of networks such as the Internet, it has become possible for users to connect devices such as computers and the like to networks to carry out communication with other devices, and to receive various services.

When devices connected to a network communicate with each other, each of the devices performs communication based on identification information of each thereof. An example of identification information is an IP address. An IP address is an identifier (ID) for identifying a device connected to a network, and in addition has role as location information indicating the location of the device in the network. For example, a prefix of an IP address forms the location information. When devices communicate, reference is made to this location information to enable execution of routing control based on the location information.

On the other hand, accompanying the increase of portable devices (referred to below as "mobile devices") in recent years, a method is becoming widely used in which management is performed by separating the identifier for identifying a mobile device and the location information indicating the location of the mobile device. In a case of using identification information including both the identifier and the location information, as with the IP address, when a connection point of a mobile device in question and the network changes accompanying a movement of the mobile device, identification information assigned to the mobile device is also changed. This is because when the connection point changes, the location information changes. Since the identifier of the mobile device also changes when the identification information is changed, it becomes difficult to maintain a network connection for the mobile device. This is a reason that the method of managing by separating the identifier and the location information of the mobile device, is becoming widely used.

Patent Literature 1 discloses technology for managing by separating an identifier and location information of a mobile device. Patent Literature 1 discloses using a "home address" as the identifier for identifying the mobile device, and using a "Care-of address" as the location information of the mobile device. That is, a method of performing management by respectively separating the identifier and the location information of the mobile device into 2 addresses is disclosed.

CITATION LIST

Patent Literature (PTL)

[PTL 1]
Japanese Patent Kokai Publication No. JP2001-268129A

SUMMARY

The entire disclosure of the above Patent Literature is incorporated herein by reference thereto. The following analysis is given by the present disclosure.

In technology disclosed in Patent Literature 1, since the identifier and the location information of the mobile device are respectively managed by different addresses, the cost of managing the addresses increases. Consequently, there is a problem in that, when devices communicate, the cost for executing routing control based on the location information increases.

According to a first aspect, there is provided a communication system, comprising: a plurality of nodes each of which forwards a packet; a terminal device to establish a connection with at least one of the nodes, and to access a network through at least one of connected nodes; and a control device to control a packet forwarding route in response to a received request which is sent from at least one of connected nodes to request for setting the packet forwarding route. The control device comprises: a unit that stores a plurality of location information respectively corresponding to the respective nodes; a unit that receives the request for setting from at least one of connected nodes; and a unit that identifies a location of the terminal device based on the location information corresponding to at least one of nodes connected to the terminal device, and controls the packet forwarding route by using the location information of the terminal device.

According to a second aspect, there is provided a control device that receives a setting request for a packet forwarding route from at least one of a plurality of nodes each of which forwards a packet, and controls the packet forwarding route in response to the setting request. The control device comprises: a unit that stores a plurality of location information respectively corresponding to the respective nodes; a unit that receives the setting request from at least one of nodes connected to a terminal device accessing a network; and a unit that identifies a location of the terminal device from the location information corresponding to at least one of nodes connected to the terminal device, and controls the packet forwarding route by using the location of the terminal device.

According to a third aspect, there is provided a communication method by a control device that receives a setting request for a packet forwarding route from at least one of a plurality of nodes each of which forwards a packet, and that controls the packet forwarding route in response to the setting request. The method comprises: receiving the setting request from at least one of nodes connected to a terminal device that has access to a network, referring to location information corresponding to at least one of nodes connected to the terminal device, from a storage unit that stores respective location information of the plurality of nodes, identifying the location of the terminal device from the location information referred to, and controlling the packet forwarding route using the location of the terminal device. It is to be noted that the present method is tied up with a specific apparatus known as a control device that sets a processing rule in the nodes.

According to a fourth aspect, there is provided a program to be executed in a control device that receives a setting request for a packet forwarding route from at least one of a plurality of nodes each of which forwards a packet, and controls the packet forwarding route in response to the setting request. The program executes: a process of receiving the setting request inquiry from at least one of nodes connected to a terminal device that has access to a network, a process of referring to location information corresponding to at least one of nodes connected to the terminal device, from a storage unit that stores respective location information of the plurality of nodes, a process of identifying the location of the terminal device from the location information referred to, and a process of controlling the packet forwarding route by using the location of the terminal device. It is to be noted that that the program can be recorded in a computer readable storage medium. That is, the present invention can be embodied as a computer program product. The storage medium may be non-transient.

The meritorious effects of the present invention are summarized as follows.

According to the present invention, there is an effect in that it is possible to execute routing control based on location information of a terminal device, without managing an address indicating location information, and it is possible to reduce the cost for executing the routing control based on the location information.

BRIEF DESCRIPTION OF DRAWINGS

FIG. 8 is a diagram for describing file meta information held in a storage management device of the second exemplary embodiment of the present invention;

FIG. 9 is a diagram for describing an object deployment management table held in a storage management device of the second exemplary embodiment of the present invention;

PREFERRED MODES

First Exemplary Embodiment

Figure 1:
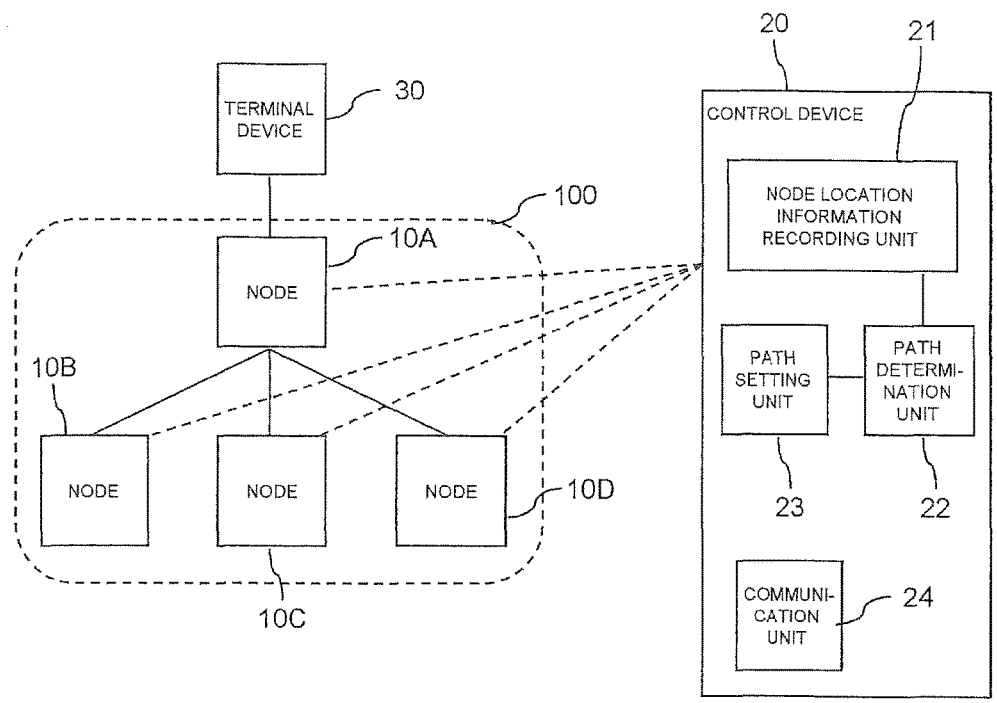
FIG. 1 is a diagram representing a configuration of a first exemplary embodiment of the present invention.

FIG. 1 is a diagram representing a configuration of a first exemplary embodiment of the present invention. As shown in FIG. 1, a system of the present invention is configured by nodes 10A to 10D that perform packet forwarding, a terminal device 30 connected to a network via at least one of the nodes 10A to 10D, and a control device 20 that controls a forwarding route of a packet in response to a request from at least one of the plural nodes.

In the present invention, the control device 20 controls the packet forwarding route in response to a request from at least one of the plural nodes 10A to 10D. OpenFlow technology exists as an example of central management technology in which the control device centrally performs control of the packet forwarding route with respect to a plurality of nodes in this way.

Figure 19:
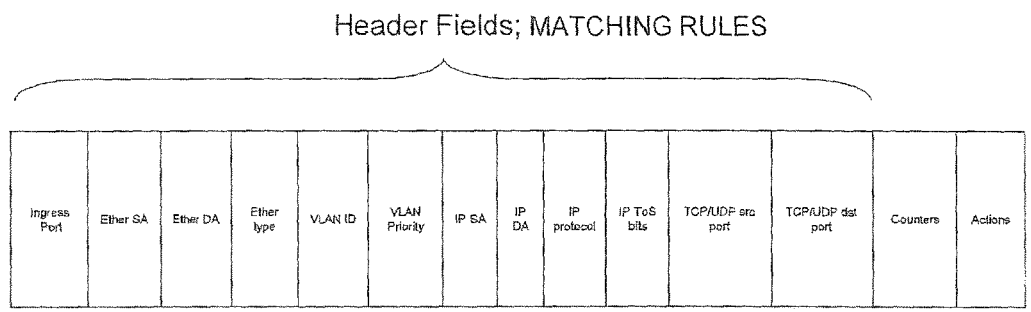
FIG. 19 is a diagram representing a configuration of flow entry in OpenFlow technology.

In OpenFlow, communication is taken as end-to-end flow, and routing control, recovery from failure, load balancing, and optimization are performed in flow units. An OpenFlow switch functioning as a relay device is provided with a secure channel for communication with an OpenFlow controller that is positioned as a control device, and operates according to a flow table in which appropriate addition or rewriting is instructed by the OpenFlow controller. In the flow table are definitions of sets of matching rules (reference rules) that refer to packet headers, flow statistical information (counters), and actions (actions) defining processing content suitable to a packet matching the matching rules (reference rules), for each flow (refer to FIG. 19).

For example, on receiving a packet, the OpenFlow switch searches for an entry having a matching rule (refer to a header field in FIG. 19) that matches header information of the received packet, from the flow table. As a result of the search, in a case where an entry matching the received packet is found, the OpenFlow switch updates the flow statistical information (counters), and in addition implements processing content (packet transmission from a specific port, flooding, dropping, and the like) described in an actions field of the entry in question, with regard to the received packet. On the other hand, as a result of the search, in a case where an entry matching the received packet is not found, the OpenFlow switch transmits a request to the OpenFlow controller via the secure channel, requests determination of a packet route based on source and destination of the received packet, receives a flow entry realizing this, and updates the flow table. In this way, the OpenFlow switch performs packet forwarding by using an entry stored in the flow table as a flow entry.

The OpenFlow technology described above may be applied to the present invention. A description is given below of an exemplary embodiment in a case of applying the OpenFlow technology to the present invention. It is to be noted that, in order to implement the present invention, the control device may control the packet forwarding route (or path) with respect to a plurality of nodes, and the present invention is not limited to the OpenFlow technology.

Figure 2:
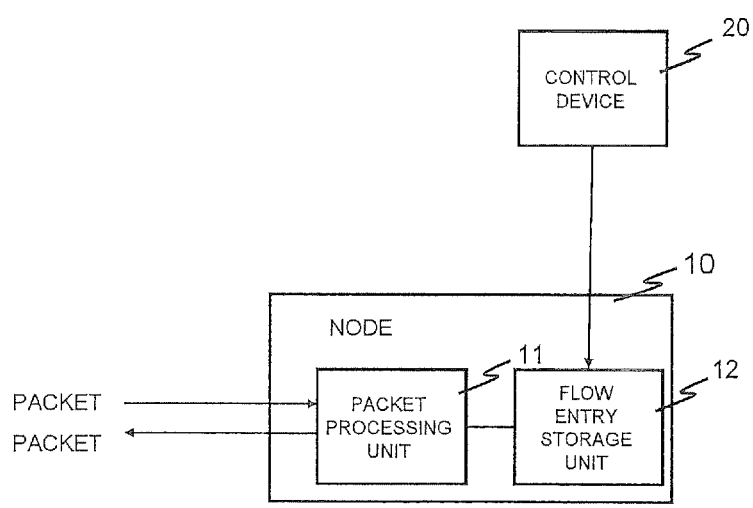
FIG. 2 is a block diagram representing a configuration of nodes of the first exemplary embodiment of the present invention.

The nodes 10A to 10D are devices that forward packets. The terminal device 30 accesses a network via at least one of the nodes 10A to 10D. In the example of FIG. 1, each of the nodes 10A to 10D establishes a secure channel for communication with the control device 20. Each of the nodes 10A to 10D operates according to a flow table in which addition or rewriting is instructed as appropriate by the control device 20. As shown in FIG. 2, the nodes 10A to 10D are configured by including a flow entry storage unit 12 that stores flow entries associating processing to be applied to a packet and matching rules for identifying a packet for which the processing is to be applied, and a packet processing unit 11 that refers to the flow entry storage unit 12 and performs packet processing in accordance with a flow entry having a matching rule that matches the received packet.

In a case where the terminal device (or host device) 30 is connected to the node 10A, the node 10A compares a packet received from the terminal device 30 and a flow entry recorded in the flow entry storage unit 12. In a case where, for example, a flow entry corresponding to the received packet does not exist, the node 10A transmits a request for setting of a flow entry to the control device 20, via the secure channel. The control device 20 that receives the request determines a route (path) corresponding to a flow to which the packet received by the node 10A from the terminal device 30 belongs, and generates a flow entry corresponding to the determined route. After generating the flow entry, the control device 20 sets a flow entry in the flow entry storage unit 12 of a node related to the determined route. It is to be noted that the control device 20 may, for example, set a flow entry in at least one of the nodes 10A to 10D. After a corresponding flow entry has been set, the packet processing unit 11 executes processing of the received packet in accordance with the flow entry that has been set.

The control device 20 controls the packet forwarding route in response to a request from at least one of the nodes 10A to 10D. The control device 20 controls location information of each of the nodes 10A to 10D. In the example of FIG. 1, the control device 20 is provided with a node location information recording unit 21 that records location information of each of the nodes 10A to 10D, a path determination unit 22 that computes a packet forwarding route (path) giving consideration to the location of the terminal device 30, a path setting unit 23 that creates a flow entry realizing the determined route (path), and sets the flow entry in a node in the route, and a communication unit 24.

The node location information recording unit 21 records location information of each of the nodes 10A to 10D. The location information, for example, besides being information of geographical locations of each of the nodes 10A to 10D, may be information of logical locations in the network. Furthermore, the location information may be information indicating that a node is in a specific area (for example, a specific country, a specific region, or the like). It is to be noted that the location information is not limited to these examples, and may be any information, as long as the control device can identify the location of a managed node. Furthermore, in a case where a new node is added, for example, location information of the added node is added to the node location information recording unit 21.

It is to be noted that in the present exemplary embodiment, a description is given in which the location information of each of the nodes 10A to 10D is recorded in the node location information recording unit 21 included in the control device 20, but this function may be configured by a different server or the like from the control device 20.

In a case where the communication unit 24 receives a request from at least one of the nodes 10A to 10D, the path determination unit 22 determines a route corresponding to the request. In a case where the communication unit 24 receives a request from a node passed through when the terminal device 30 accesses the network, the path determination unit 22 determines a route using the location of the terminal device. That is, in a case of receiving a request from a node to which the terminal device 30 is connected, the path determination unit 22 determines the route (path) using the location of the terminal device. It is to be noted that "a node to which the terminal device 30 is connected" includes a case where the terminal device 30 is connected indirectly to the node via another device. For example, in a case where the terminal device 30 is a mobile terminal such as a mobile telephone or the like, the terminal device 30 is connected to the node via a base station or the like. The path determination unit 22 refers to location information corresponding to the node to which the terminal device 30 is connected, from the node location information recording unit 21. The path determination unit 22 estimates the location of the terminal device 30 connected to the node, based on the location information referred to. According to this configuration, the communication system (or network system) of the present invention can recognize the location of the terminal device (e.g., host device) 30, without managing information (for example, information indicating the location of the terminal device 30, such as care-of address) related to the location of the terminal device 30.

For example, a prescribed node (for example, node 10A) is a node exclusively for terminal connection, and in a case where the control device 20 receives a request from this prescribed node, the path determination unit 22 recognizes that this request is a request from a node to which the terminal device 30 is connected. For example, a request from a prescribed node set at an edge of the network may be recognized as a request from a node to which the terminal device 30 is connected. That is, the control device 20 records an ingress node, being network ingress for the terminal device 30, and recognizes that a request from the ingress node is a request from a node to which the terminal device 30 is connected. In this case, with regard to the request from a node provided in a core, control may be performed for a packet forwarding route without considering the location of the terminal device 30.

Furthermore, for example, a prescribed port of a prescribed node (for example, node 10A) is set to a port exclusively for terminal connection, and in a case where the control device 20 receives a request related to this prescribed port, the path determination unit 22 recognizes that this request is a request from a node to which the terminal device 30 is connected. In addition, the control device 20 may recognize that this is a request from the node to which the terminal device 30 is connected, based on the prescribed information (header information) included in a packet related to the request received from the prescribed node (for example, node 10A).

It is to be noted that a system in which the path determination unit 22 recognizes whether or not the request is from a node to which the terminal device 30 is connected, is not limited to the content described above.

In order to forward a packet according to the route determined by the path determination unit 22, the path setting unit 23 creates a flow entry for setting, for a node related to the determined route. The flow entry created by the path setting unit 23 is notified to a node via the secure channel.

It is to be noted that respective functions of the control device 20 can also be realized by a computer program that causes the abovementioned respective processing to be executed, using information received from the node location information recording unit 21 and the computer hardware.

The terminal device 30 is connected to the network via at least one of the nodes 10A to 10D. In the example of FIG. 1, the terminal device 30 is connected to the network via the node 10A. The terminal device 30, due to moving, may be connected to another node outside of the node 10A, and in this case, is connected to a network at the movement destination.

Figure 3:
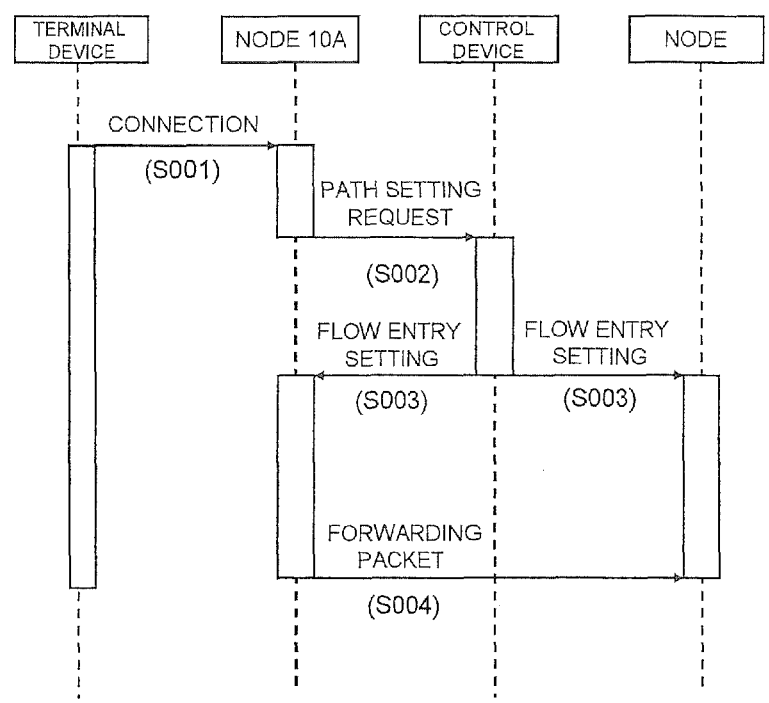
FIG. 3 is a sequence diagram representing operation of the first exemplary embodiment of the present invention.

Next, a detailed description is given concerning operation of the present exemplary embodiment, making reference to the drawings. FIG. 3 is a sequence diagram representing flow where the terminal device 30 connects to the network via the node 10A and transmits a packet.

First, the terminal device 30 connects to the node 10A and transmits the packet (S001 in FIG. 3). The node 10A that receives the packet compares the received packet and flow entries recorded in the flow entry recording unit 12. In a case where a flow entry corresponding to the received packet does not exist, the node 10A transmits a request (path setting request) for setting of a flow entry (S002 in FIG. 3).

The control device 20 that receives a request for setting a route (path) detects location information of the node 10A that has received the request from the node location information recording unit 21, and recognizes the location of the terminal device 30 from the detected location information. The control device 20 gives consideration to the recognized location, to determine a route of the packet transmitted by the terminal device 30. A flow entry corresponding to the determined route is created, and notification of the flow entry is given to nodes on the determinate route (S003 in FIG. 3).

Thereafter, the node 10A forwards the packet to other nodes, in accordance with the flow entry notified by the control device 20 (S004 in FIG. 3).

A detailed description is given below concerning respective operations of the nodes and the control device in the sequence of FIG. 3, making reference to FIG. 4 and FIG. 5.

(Nodes)

Figure 4:
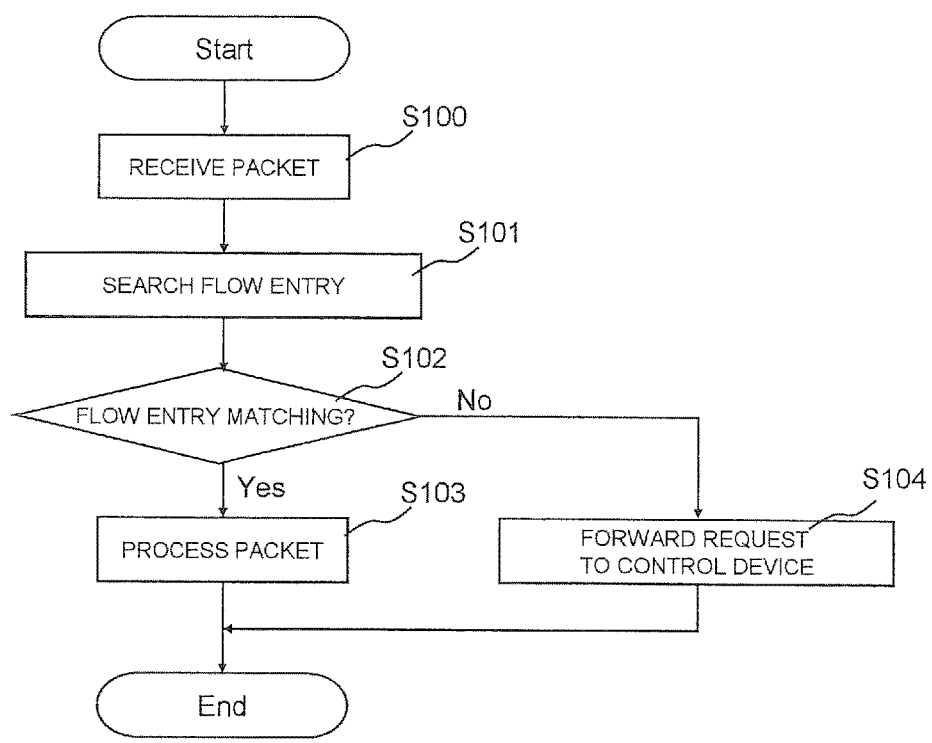
FIG. 4 is a flowchart representing operation of the node of the first exemplary embodiment of the present invention.

FIG. 4 is a flowchart representing flow of processing with respect to node 10A.

On receiving a packet from the terminal device 30 at the node 10A (step S100), the node 10A searches the flow entry recording unit 12, and checks for the presence of a flow entry matching a received packet (step S101).

In a case where a flow entry matching a received packet is found (YES in step S102), the node 10A executes processing content defined in the flow entry in question (step S103).

In a case where a flow entry matching a received packet is not found (NO in step S102), the node 10A transmits a request for setting of a flow entry with respect to the received packet, to the control device 20 (step S104).

(Control Device)

Figure 5:
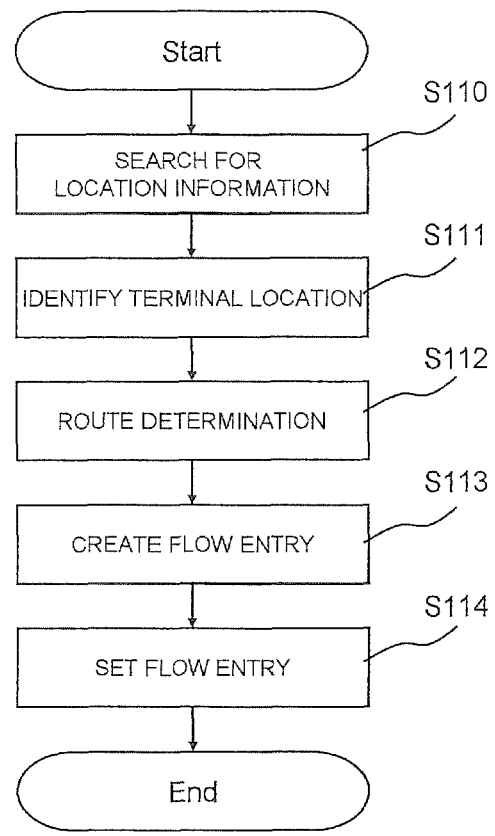
FIG. 5 is a flowchart representing operation of a control device of the first exemplary embodiment of the present invention.

FIG. 5 is a flowchart representing flow of processing in the control device that receives a request from the node 10A described above.

First, the control device 20 searches for location information of the node 10A that has transmitted the request, from the node location information recording unit 21 (step S110), and identifies the location of the terminal device 30 based on the retrieved location information (step S111).

Next, the control device 20 determines a packet route, based on the location of the terminal device 30 identified in step S111 described above (step S112).

Next, the control device 20 creates a flow entry to be set in a node in the determined route (step S113).

Finally, the control device 20 sets a flow entry created in step S113, in a node in the determined route (step S114).

As described above, according to the present exemplary embodiment, the control device 20 manages location information of each of the nodes 10A to 10D, and identifies the location of the terminal device 30, based on the location information of a node to which the terminal device 30 is connected. Thus, the control device 20 can control a packet forwarding route based on the location of the terminal device 30, without managing information related to the location of the terminal device 30.

Second Exemplary Embodiment

In a second exemplary embodiment of the present invention, a control device 20 computes a route to a service providing device that can provide a desired service, from a terminal device 30, based on the location of the terminal device 30, and in addition sets a flow entry to perform packet forwarding in accordance with the route, to a node on the route. It is to be noted that in the present exemplary embodiment, since there are portions that can be realized by a configuration the same as the first exemplary embodiment, the description below is centered on points of difference from the first exemplary embodiment.

Figure 6:
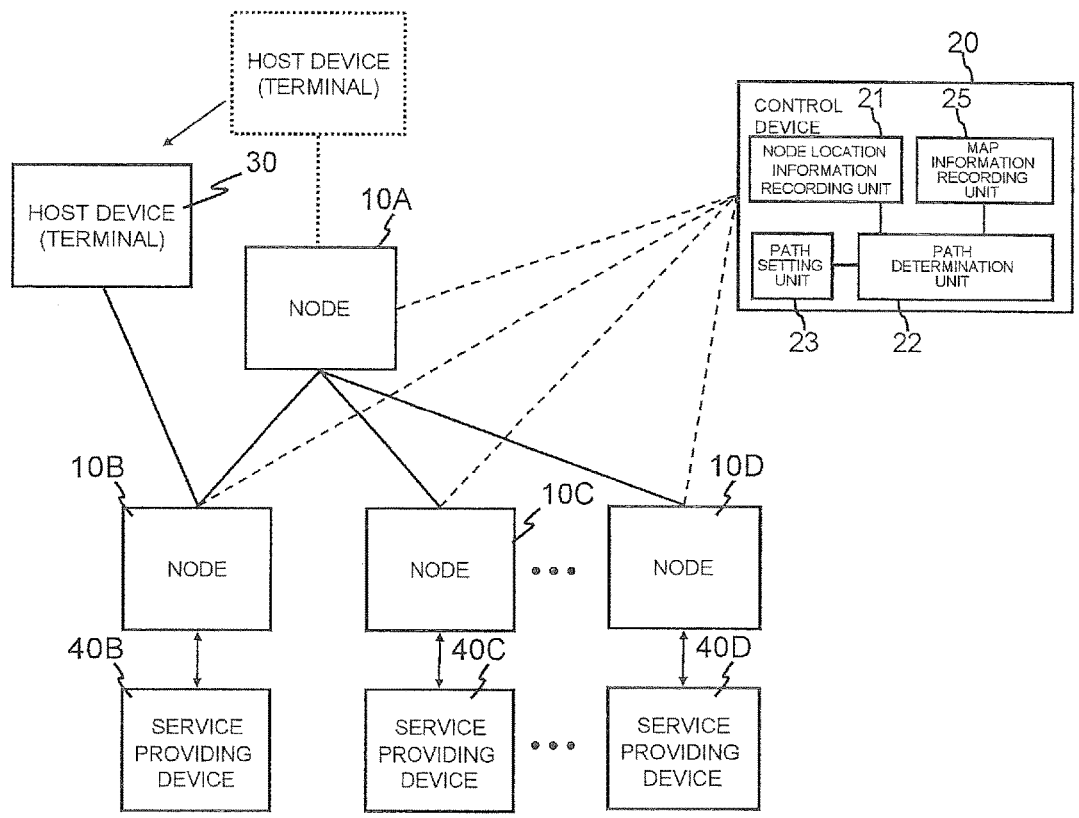
FIG. 6 is a diagram representing a configuration of a second exemplary embodiment of the present invention.

The second exemplary embodiment of the present invention, as shown in FIG. 6, is configured from nodes 10A to 10D that perform packet forwarding, the terminal device (e.g., host device) 30 that is connected to a network via at least one of the nodes 10A to 10D, service providing devices 40B to 40D that are respectively connected to the nodes 10B to 10D, and the control device 20 that controls a packet forwarding route in response to a request from at least one of the plurality of nodes. It is to be noted that a system configuration of the present invention is not limited to a configuration shown in FIG. 6 and, for example, another node can exist between the node 10A and the nodes 10B to 10D.

The second exemplary embodiment of the present invention is further provided with a map information recording unit 25 to store map information that records service alternative relationships, the services being provided by the respective plural service providing devices 40B to 40D. The alternative relationships are information indicating, for example, that the service providing device 40D can provide a service provided by the service providing device 40B, and the like. The map information includes, for example, information concerning a service providing device that is regarded as being substantially the same, as in a mirror server of a certain server, or a server that omits/substitutes a partial function (partial service) of a certain server.

With regard to the control device 20, in a case where the terminal device (host device) 30 that is provided with a service from the service providing device 40C via the nodes 10A and 10C has moved to a solid line location from a dotted line location in FIG. 6, the control device 20 refers to the map information and confirms whether or not there is another service providing device that can substitute for a service providing device 40. Here, the service providing device 40B can substitute for the service providing device 40C. The control device 20 computes the shortest route, for example, among routes between the node 10B to which the terminal device 30 that has moved is connected, and the service providing device 40C that has provided a service before the terminal device 30 moved, or the service providing device 40B that substitutes therefor. Here, a route accessing the service providing device 40B via the node B is the shortest. The control device 20 sets a flow entry in a corresponding node, based on the computed shorted route. It is to be noted that the route computation by the control device 20 is not limited to computation of the shortest route. The control device 20 computes a route based on cost required for access between the terminal device 30 and a service providing device.

The computation of the route by the control device 20 is not limited to computation of the shortest route. For example, in accordance with load on the service providing device connected to the node 10B or a traffic state between the node 10B and the service providing device 40B, the control device 20 may compute a route (path) via node 10B-node 10A-(node 10C or node 10D).

Furthermore, in a case where the terminal device 30 returns from the solid line location of FIG. 6 to the dotted line location, the control device 20 computes the shortest route accessing any of the service providing devices 40B to 40D via the node 10A and any one of the nodes 10B to 10D (consideration may be given to the load on the respective nodes 10B to 10D or to traffic, as described above), and sets a flow entry to forward a packet exchanged between the terminal device (host device) 30 and the service providing devices 40B to 40D in accordance with the route, to nodes on the route.

According to a setting of the abovementioned flow entry, a data access route is set between the terminal and the service providing devices 40B to 40D that can provide a service to which the terminal device is attempting access.

In the second exemplary embodiment of the present invention, a service providing device may be a storage device, for example. Below, a description is given of an exemplary embodiment in a case where the service providing device is a storage device. It is to be noted that, in order to implement the present invention, the service providing device may be a device providing a service that is desired by the terminal device, and the present invention is not limited to storage.

Figure 7:
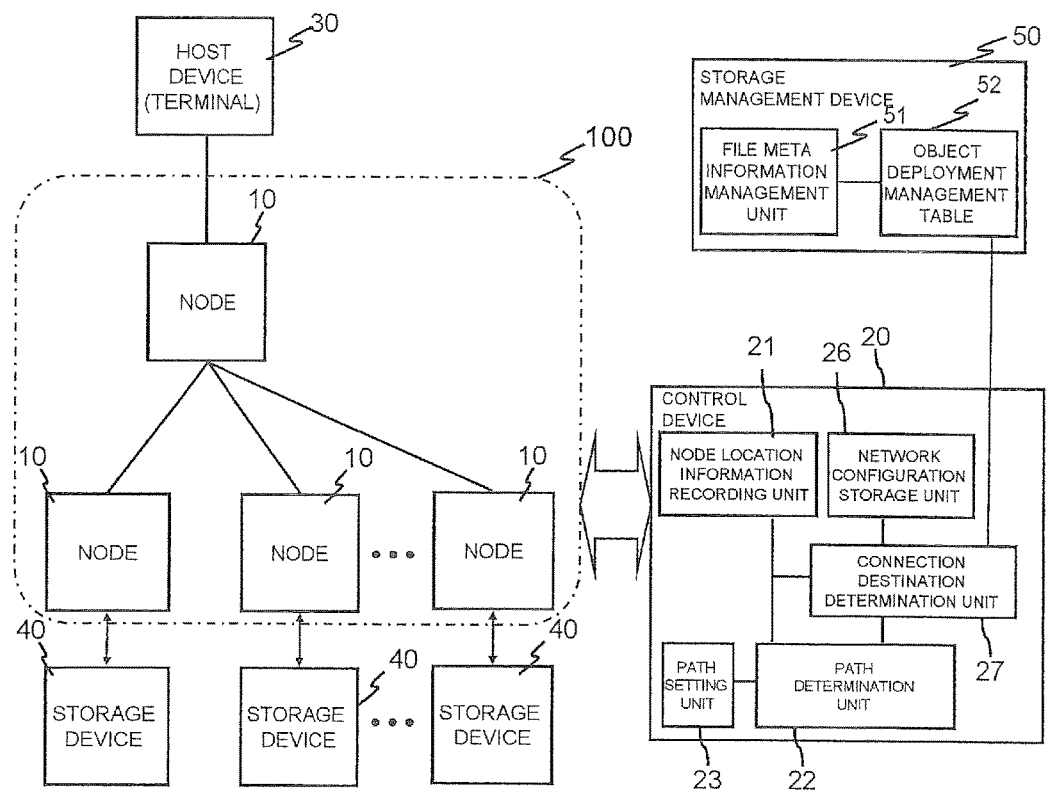
FIG. 7 is a diagram representing a configuration of a case where a service providing device is a storage device in the second exemplary embodiment of the present invention.

FIG. 7 is a diagram representing a configuration of the control device 20 when applied to a storage device in the second exemplary embodiment of the present invention. Referring to FIG. 7, a plurality of storage devices 40, a network 100 formed by a plurality of nodes 10, the control device 20, the terminal device (host device) 30, and a storage management device 50 are shown.

A storage device 40 is, for example, a block access device connected with a protocol such as a FC (Fiber Channel), iSCSI (Internet Small Computer System Interface), FCoE (FC over Ethernet), Express Ethernet, or the like, NAS (Network Attached Storage), or a file server or the like.

It is to be noted that files accessed by the terminal device 30 are configured by one or more objects, and are stored in respective storage devices in object units.

In the example of FIG. 7, the control device 20 is further provided with a network configuration storage unit 26 that stores a network topology representing connection relationships of the nodes 10 and the storage devices 40, and a connection destination determination unit 27 that determines a storage device that is an access point by referring to the network topology and node location information, from among the storage devices storing the same object notified by the storage management device 50.

The network topology relates to information indicating which of the nodes 10 is connected to a storage device 40. It is to be noted that in the example of FIG. 7, a description has been given in which the network configuration storage unit 26, which records the network topology, and the node location information recording unit 21, which records location information of the nodes, have different configurations, but the 2 recording units may have the same configuration unit. In that case, the network topology and the node location information are included in the same information, and, for example, an association is made between an identifier of a node, location information of the node in question, and an identifier of a storage device connected to the node in question, to be recorded.

The terminal device 30 transmits, to the node 10 side, a packet including an identifier of an object included in meta information received from the storage management device 50, and receives a packet returned from a storage device 40 via the node 10.

The storage management device 50 is a device known as a meta server or the like, for managing which of the storage devices 40 stores respective data. In the example of FIG. 7, the storage management device 50 is provided with a file meta information management unit 51 that manages meta information such as information of objects configuring a file (or a logical unit) and file attributes or the like; and an object deployment management table 52 that stores which storage device among the plurality of storage devices 40 is storing an object. The meta information of the file described above and the object deployment management table 52 correspond to map information shown in FIG. 6.

FIG. 8 is an example of file meta information managed in the file meta information management unit 51. In the example of FIG. 8, besides file attributes such as a file name, time stamp, and the like, and an identifier of an object (group) forming the file, a deployment policy of the file in question can be stored.

The deployment policy of the file is a policy concerning configuration or forwarding destination of each file; for example, a storage device or a geographical area that can store (cannot store) the file in question is set. Furthermore, as a deployment policy of a file, the storage device or the geographical area that can provide a service using the file in question may be determined.

Furthermore, from a viewpoint of legal regulations and security policy, the deployment policy of the file in question may set information (policy) disallowing access from a specific region, or information (policy) allowing access only with regard to a specific region. In a case where a storage device is disposed to extend over a plurality of countries and territories, when a restriction is made to an accessible country or territory from the viewpoint of legal regulations and security policy, this type of setting can be used to limit storage devices that the terminal device 30 can access.

In a case where the file deployment policy as described above is set, the connection destination determination unit 27 determines a storage device which the terminal device 30 accesses, based on the file deployment policy in question. For example, in a case where a file deployment policy is set in which a storage device in a specific area cannot be accessed from a location at which the terminal device 30 is connected, a storage device that the terminal device 30 can access is determined from storage devices outside of the storage devices in the specific area.

It is to be noted that to fit the present exemplary embodiment, a description has been given with a policy related to a storage device storing a file, but in accordance with the exemplary embodiment the policy in question clearly has various modes. For example, in an exemplary embodiment where a terminal device connects to a service providing device, a policy may be set which is related to a service providing device accessible (non-accessible) by the terminal device 30, based on legal regulations or security policy.

FIG. 9 is an example of an object deployment management entry held in the object deployment management table 52. The example of FIG. 9 has a configuration such that for each object an ID of a storage device storing the object in question is stored.

It is to be noted that in the present exemplary embodiment a description is given in which the storage management device 50 has a function to manage a name space such as a directory that manages corresponding relationships of files and names spaces of a file system, but this function can also be configured by another server or the like, or as an element of the control device 20.

Furthermore, respective units (processing means) of the control device 20 shown in FIG. 7 can also be realized by a computer program that causes the abovementioned respective processing to be executed in a computer forming the control device 20, using hardware thereof and information received from the storage management device 50.

Figure 10:
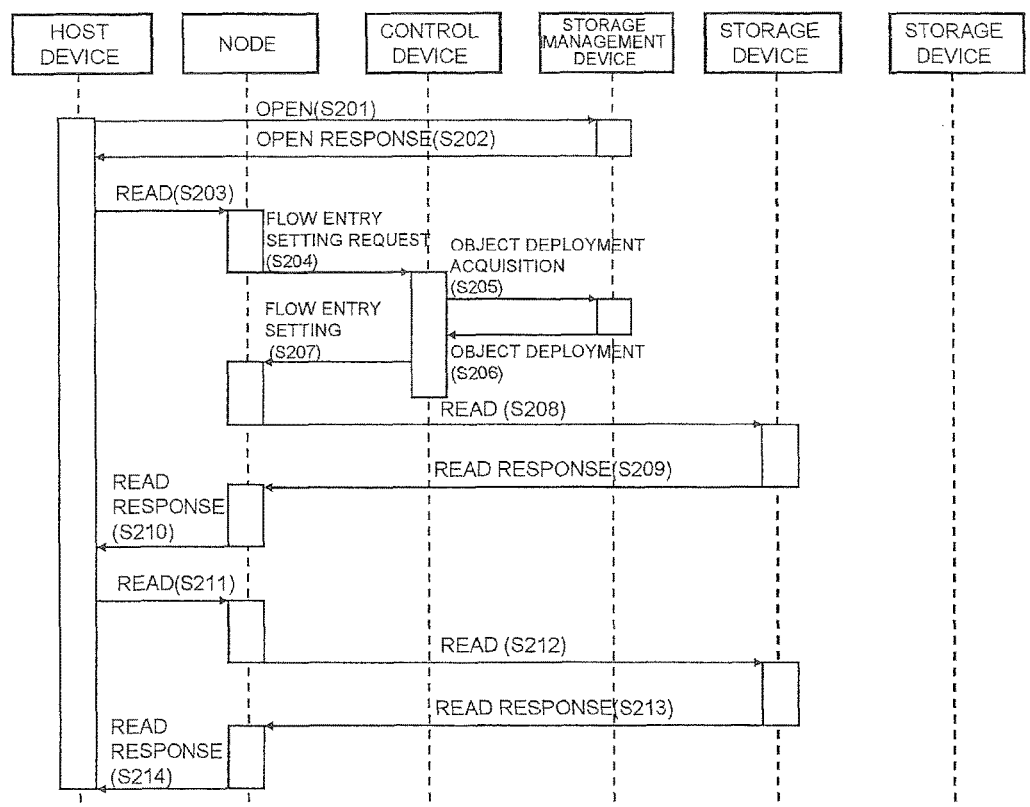
FIG. 10 is a sequence diagram representing operation in a case where the service providing device is a storage device in the second exemplary embodiment of the present invention.

Next, a detailed description is given concerning operation of the present exemplary embodiment, making reference to the drawings. FIG. 10 is a sequence diagram representing flow when the terminal device 30 accesses data within a storage system.

FIG. 10 is a sequence diagram representing operation of the second exemplary embodiment of the present invention. Referring to FIG. 10, first, when the terminal device (as a host device) 30 makes a request to "Open" a file, to the storage management device 50 (S201 in FIG. 10), the storage management device 50 returns an "Open" response including meta information (object information forming the file) of the file (S202 in FIG. 10).

Thereafter, when a packet related to access is transmitted to the node 10 side (S203 in FIG. 10) for read/write access or the like by the terminal device 30, each node 10 refers to the flow entry recording unit 12, but since there is no relevant flow entry, the received packet is transmitted to the control device 20, and setting of a flow entry is requested (S204 in FIG. 10).

The control device 20 that receives the request to set the flow entry requests a list (object deployment) of a storage device group storing objects specified by identifiers of objects included in the received packet, to the storage management device 50 (S205 in FIG. 10).

When the storage management device 50 refers to the object deployment management table 52 and transmits the list (object deployment) of the storage device group storing objects (S206 in FIG. 10), the control device 20 determines an appropriate storage device 40 from among the storage device group, based on respective locations of the storage devices included in the list of the storage device group and the location of the terminal device 30, and computes access routes (paths) between the terminal device 30 and the storage device group 40. After that, with regard to the computed route, the control device 20 creates flow entries realizing respective access routes (paths), and performs setting in the nodes 10 in the computed access route (path) (S207 in FIG. 10).

The nodes 10 that receive the flow entry settings forward a received packet that was buffered when received, or a packet returned from the control device 20, in accordance with a set flow entry (S208 in FIG. 10).

Thereafter, when a packet related to access is transmitted to the node 10 side, for read/write access by the terminal device 30 (S211 in FIG. 10), each node 10 forwards a packet related to access to the storage devices 40 determined as access points of the objects, based on the set flow entries (S212 of FIG. 10). Furthermore, each node 10 forwards to the terminal device 30 a packet returned from the storage devices 40, based on the set flow entries (S213 and S214 of FIG. 10).

A detailed description is given below concerning operations of the respective devices in the sequence of FIG. 10, making reference to FIG. 11, FIG. 12, FIG. 13, and FIG. 14.

(Terminal Device (File Access after "Open"))

Figure 11:
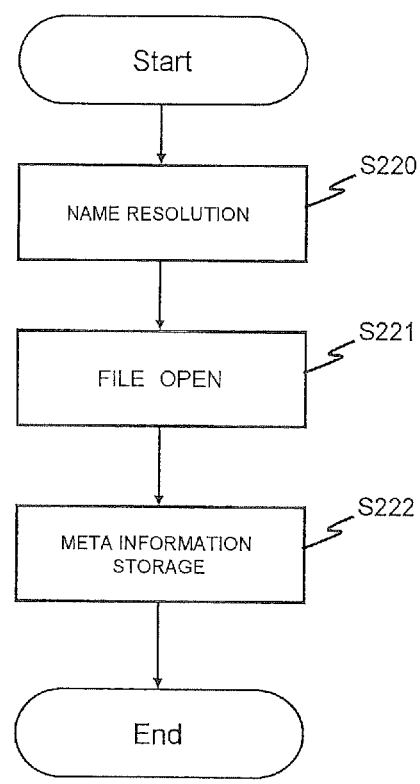
FIG. 11 is a flowchart representing operation of a terminal device in a case where the service providing device is a storage device in the second exemplary embodiment of the present invention.

FIG. 11 is a flow chart representing flow of processing from an "Open" request with respect to a file, by the terminal device (host device) 30 of FIG. 10, to receipt of meta information of the file as a response (S201 to S203 of FIG. 10).

First, the terminal device 30 requests name resolution with respect to the storage management device 50, and acquires information of a file corresponding to a path name (step S220).

Next, the terminal device 30 makes an "Open" request, specifying the acquired file, with respect to the storage management device 50 (step S221).

Next, the terminal device 30 stores the meta information of the received file as a response from the storage management device 50 (step S222). The meta information of the file includes information of objects forming the file (refer to FIG. 8).

Finally, the terminal device 30 transmits a packet related to access to the node 10 side, for read/write access (S203 of FIG. 10).

(Storage Management Device)

Figure 12:
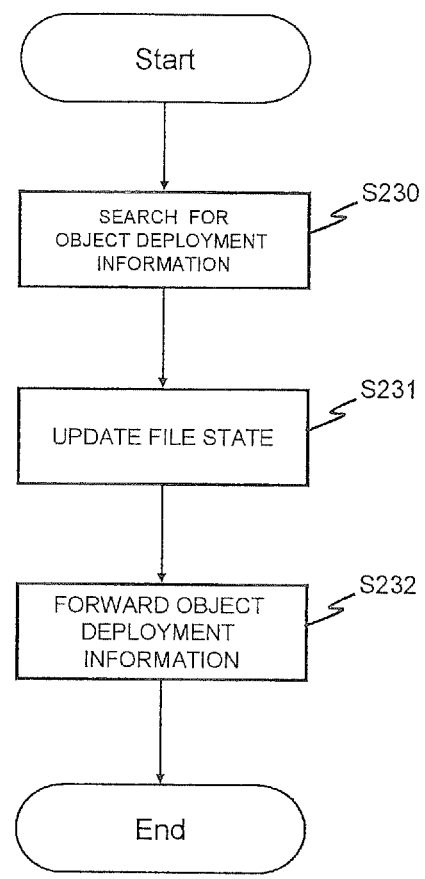
FIG. 12 is a flowchart representing operation of the storage management device in a case where the service providing device is a storage device, in the second exemplary embodiment of the present invention.

FIG. 12 is a flow chart representing flow of processing up to when the storage management device 50 of FIG. 10 transmits a response with respect to an object deployment acquisition request from the control device 20 (S205 to S206 of FIG. 10).

First, the storage management device 50 refers to the object deployment management table 52 to search for a storage device in which an object forwarded from the terminal device 30 is deployed (S230).

Next, the storage management device 50 updates a state of a file specified by the terminal device (host device) 30 to an "Open" state, with regard to the control device 20 (S231).

Next, the storage management device 50 transmits a list (object deployment information) of the storage device group storing the object searched for, to the control device 20 (step S232).

(Control Device)

Figure 13:
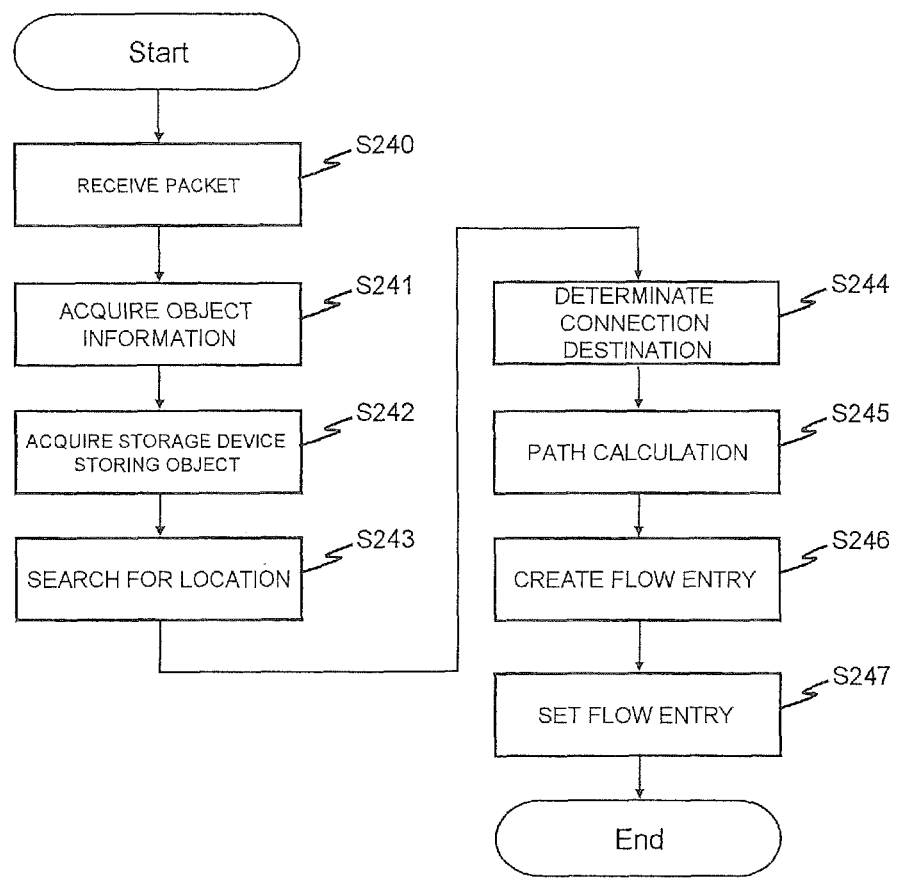
FIG. 13 is a flowchart representing operation of a control device in a case where the service providing device is a storage device, in the second exemplary embodiment of the present invention.

FIG. 13 is a flowchart representing flow of processing in the control device 20 that has received forwarding of the received packet from a node 10 in S204 of FIG. 10.

On receiving the packet (step S240), the control device 20 acquires an identifier of an object from the received packet (step S241).

Next, the control device 20 acquires a list (object deployment information) of the storage device list storing the object in question, from the storage management device 50 (step S242).

Next, the control device 20 refers to the network topology stored in the network configuration storage unit 26, identifies a node to which a storage device included in the list is connected, detects location information of the node from the node location information recording unit 21, and identifies the location of the storage device included in the list. Furthermore, the control device 20 refers to the node location information recording unit 21, detects the location information of the node that has transmitted the packet, and identifies the location of the terminal device to which the node is connected (step S243).

Next, the control device 20 selects the storage device to which the terminal device 30 should be connected, based on the location checked in step S243 described above (step S244). Selection of the storage device can be determined based on information such as throughput, response time, and load on communication route. That is, the control device 20 selects the storage device based on cost required for accessing the storage device.

Next, the control device 20 computes an access route (path) connecting the terminal device 30 and the selected storage device 40 (step S245).

Next, the control device 20 creates a flow entry set in a node 10 in the computed access route (path) (step S246). An identifier of an object is included in a matching rule of the flow entry, and it becomes clear which object the packet transmitted and received is accessing. As processing (action) applied to a packet among flow entries, when a packet matching a processing rule as described above is received, processing is set for outputting a packet from a port to which is connected a subsequent node in the access route (path) computed for each object.

Finally, the control device 20 sets a flow entry created in step S246, in a node 10 in the computed access route (path) (step S247).

(Nodes)

Figure 14:
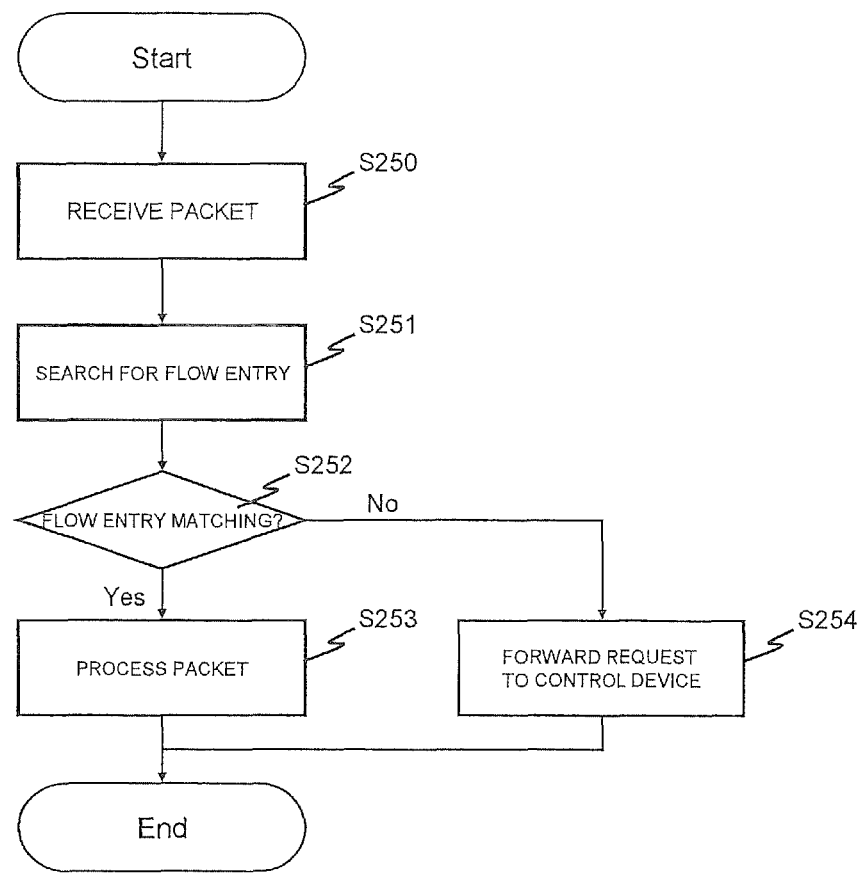
FIG. 14 is a flowchart representing operation of a node in a case where the service providing device is a storage device, in the second exemplary embodiment of the present invention.

FIG. 14 is a flowchart representing flow of processing with respect to a node 10 in FIG. 10.

On receiving a packet (step S250) the node 10 searches for a flow entry having a matching rule that matches the received packet, from the flow entry recording unit 12 (step S251).

As a result of the search, in a case where a flow entry matching the received packet is found (YES in step S252), the node 10 executes processing content defined in the flow entry in question (step S253).

On the other hand, in a case where a flow entry matching the received packet is not found (NO in step S252), the node 10 forwards the packet to the control device 20, and makes a request for flow entry setting (step S254).

As described above, in the present exemplary embodiment when access is actually carried out, realization is possible in a mode in which an access route (path) and a flow entry are set. In the present exemplary embodiment, in an example where the service providing device is a storage device, it is possible to provide access to an appropriate storage device 40, by only performing the same processing as normal file access to the terminal device 30. A reason for this is that the configuration is such that the control device 20 makes an appropriate selection from among the storage device group storing data to be accessed by the terminal device 30, and performs route control.

Third Exemplary Embodiment

In the second exemplary embodiment described above, a description was given in which objects are deployed to be dispersed by a prescribed method in storage devices, but it is also possible to add a function revising deployment of the objects.

Below, a description is given concerning a third exemplary embodiment in which a function to revise the deployment of the objects is added. It is to be noted that in the following description, matter already described in the first and second exemplary embodiments is omitted as appropriate.

Figure 15:
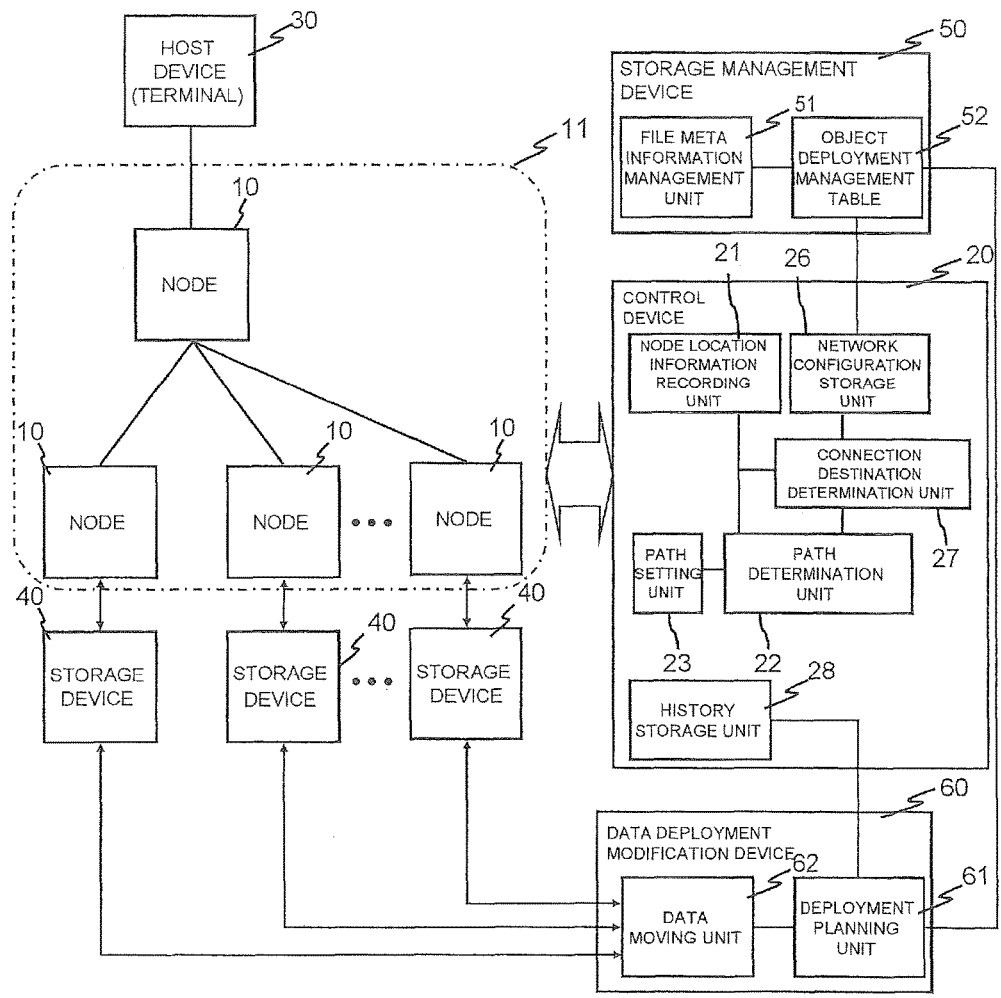
FIG. 15 is a block diagram representing a configuration of a third exemplary embodiment of the present invention.

FIG. 15 is a diagram representing a configuration of the third exemplary embodiment of the present invention. Referring to FIG. 15, in comparison to the second exemplary embodiment, the configuration has a history storage unit 28 added to a control device 20, and also a data deployment modification device 60 is added.

The history storage unit 28 of the control device 20 records packet transit history and flow entry setting history in each node 10 inside a network 100. With regard to this history information, in OpenFlow technology it is possible to use flow statistical information (counters) recorded by respective switches for each flow entry in OpenFlow switches.

The data deployment modification device 60 is provided with a deployment planning unit 61 that analyzes history information held in the history storage unit 28 of the control device 20 and judges whether or not to perform copying of an object, and a data moving unit 62 that performs copying of an object among storage devices 40 in accordance with an instruction to the deployment planning unit 61. It is to be noted that in the present exemplary embodiment, the data deployment modification device 60 is provided as an independent device, but a configuration is also possible in which a function equivalent to the data deployment modification device 60 is added to a storage management device 50 or the control device 20.

Figure 16:
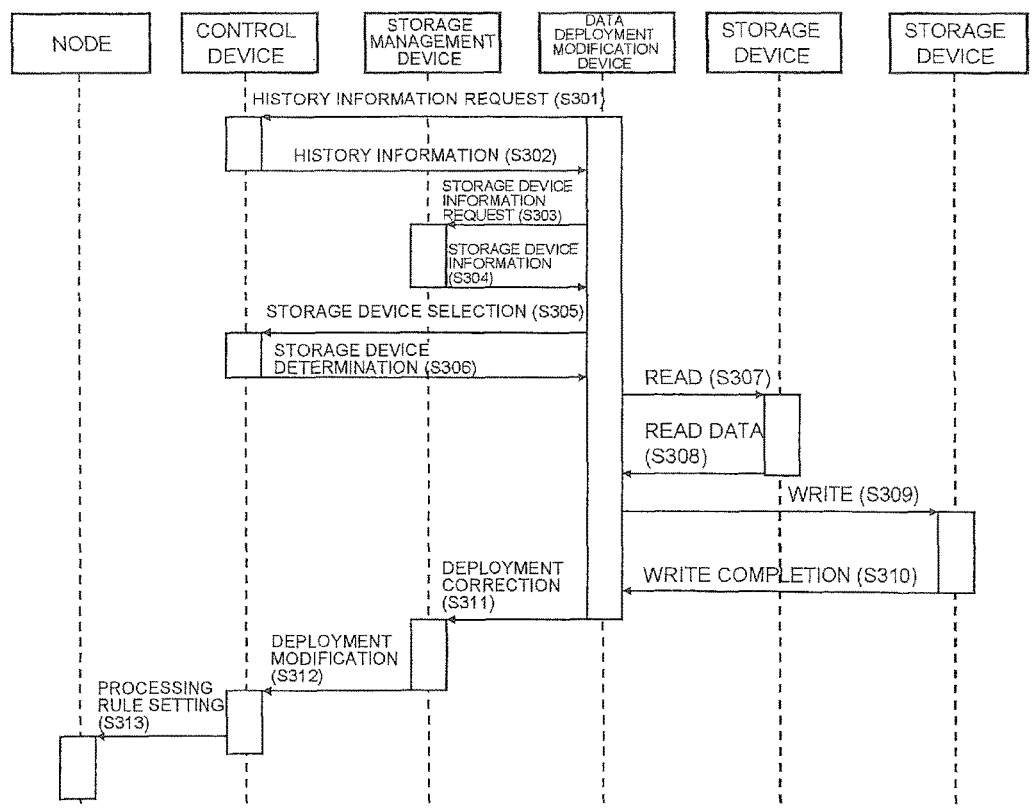
FIG. 16 is a sequence diagram representing operation of the third exemplary embodiment of the present invention.

Next, a detailed description is given concerning operation of the present exemplary embodiment, making reference to the drawings. FIG. 16 is a sequence diagram representing operation of the third exemplary embodiment of the present invention.

When data modification processing is started, at timing such as at a fixed point in time, at a fixed time interval, on realization of a prescribed condition, or the like, the data deployment modification device 60 acquires history information held in the history storage unit 28 of the control device 20 (S301 and S302 in FIG. 16).

The history information acquired by the data deployment modification device 60 includes information of an identifier of an object, a terminal device, and a storage device actually accessed. From this history it is possible to determine a terminal device having temporal locality for access to an object. A terminal device having temporal locality for access to an object is, for example, a terminal device having an access frequency to a specific object that is higher than a threshold, or the like.

Next, the data deployment modification device 60 refers to the terminal device that has the above locality and a storage device list held in the object deployment table 52 of the storage management device 50, and selects a storage device 40 in the neighborhood of a terminal device in the network. Here, whether the storage device is in the neighborhood of a terminal device in the network can be determined by the number of hops required from network topology and location information of nodes, response time separately measured, and the like. That is, the data deployment modification device 60 determines a neighborhood storage device based on cost required to access the storage device. For example, a storage device for which the number of hops from a terminal device is smallest among route candidates, may be determined as a neighboring storage device with respect to the terminal device.

Next, the data deployment modification device 60 performs copying of an object that is a target for deployment revision, in the selected storage device 40 (S303 to S306 of FIG. 16).

Next, the data deployment modification device 60 gives notification of an increase in the storage device storing the object that is a target for deployment revision, to the storage management device 50 (S307 in FIG. 16).

At an occasion of receiving a notification of deployment modification of an object, the storage management device 50 specifies information of the object and a storage device group storing the object, to the control device 20, and requests re-computation of an access route (path) (S309 in FIG. 16).

After performing re-computation of the access route (path) once again, based on the information of the object and a storage device group storing the object, the control device 20 creates a flow entry realizing the access route (path) after the re-computation, and performs setting of the flow entry to the node 10 in question (S310 of FIG. 16).

Figure 17:
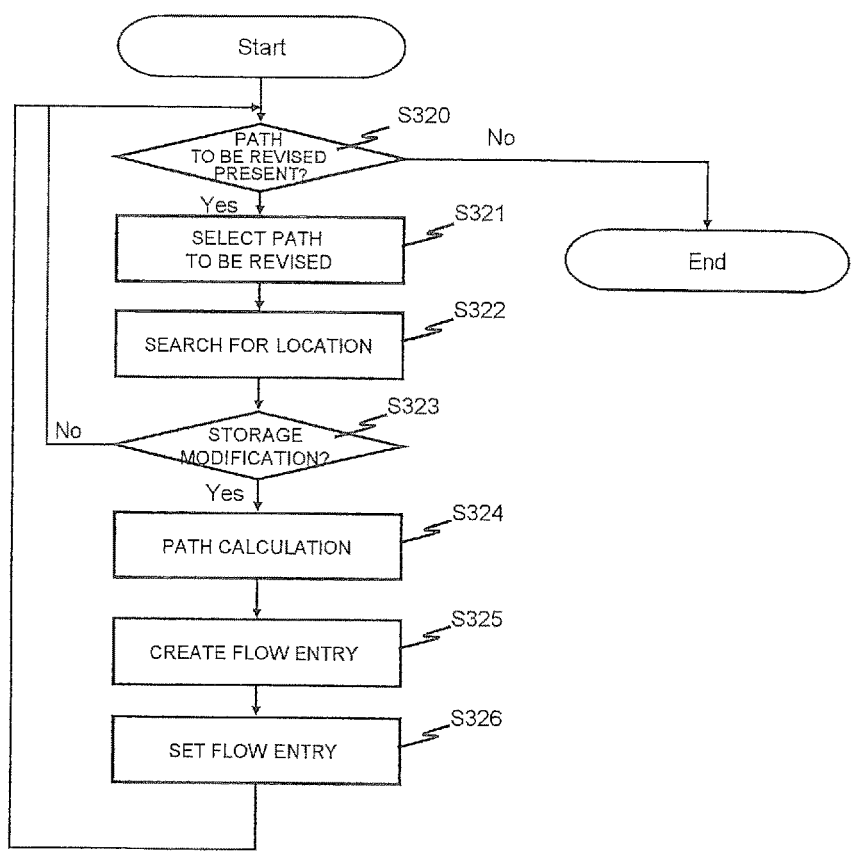
FIG. 17 is a flowchart representing operation of a control device of the third exemplary embodiment of the present invention.

FIG. 17 is a flowchart representing operation of the control device that receives a request to perform re-computation of the access route (path) described above.

The control device 20 selects an arbitrary route (path) from among existing access route (paths) having the object whose deployment was modified, as an access destination (step S321), refers to the network topology stored in the network configuration storage unit 26, and investigates the terminal device 30 and the network location of the storage device group after modification (step S322).

Next, the control device 20 judges whether or not optimization is possible by modifying the connection destination storage device (step S323 "storage modification"). Here, in a case of judging that modification of the storage device is better (YES in step S323 "storage modification"), the control device 20 computes an access route (path) in which the connection destination storage device is modified (step S324), and computes a flow entry to be set in a node in the access route (path) (step S325). Finally, the control device 20 sets the computed flow entry in the node 10 (step S326).

On the other hand, in a case of judging that modification of the storage device is unnecessary, control returns to step S320, and a subsequent route (path) that is a target for revision is selected.

The above processing is performed for an existing access route (path) having an object whose configuration was modified as an access point.

As described above, in the present exemplary embodiment, giving consideration to the network location of a terminal device, it is possible to copy data to an optimal storage device. A reason for this is that data access history is held in the control device, and based on this history the terminal device 30 gives consideration to cost when accessing an object, so as to be able to determine a storage device for storing the data.

It is to be noted that, on an occasion of modifying the deployment of an object in the exemplary embodiment described above, a description has been given in which revision of the access point storage device is performed, but clearly it is possible to perform revision of an access point storage device on an occasion of a storage device failure, or a change in load.

In the exemplary embodiment described above, a description has been given in which the object is copied (replicated), but clearly it is possible to move the object. Furthermore, it is possible to provide a function that deletes an object as appropriate at a prescribed occasion.

In addition, in a case of modifying the deployment of an object, the data deployment modification device 60 may refer to a deployment policy (refer to FIG. 8) of meta information of a file.

For example, when a deployment policy is decided such that a file "a" may not be stored in a region A, even if a storage device in which an object is newly copied is at an optimal network location for the terminal device 30, in a case where the storage device in question is in the region A it is possible to arrange such that selection does not occur.

In the same way, for example, when a deployment policy is decided such that a file "b" is used in a service "d" and that this service "d" may not be operated in a region C, even if a storage device in which an object is newly copied is at an optimal network location for the terminal device 30, in a case where the storage device in question is in the region C, it is possible to arrange such that selection does not occur.

Figure 18:
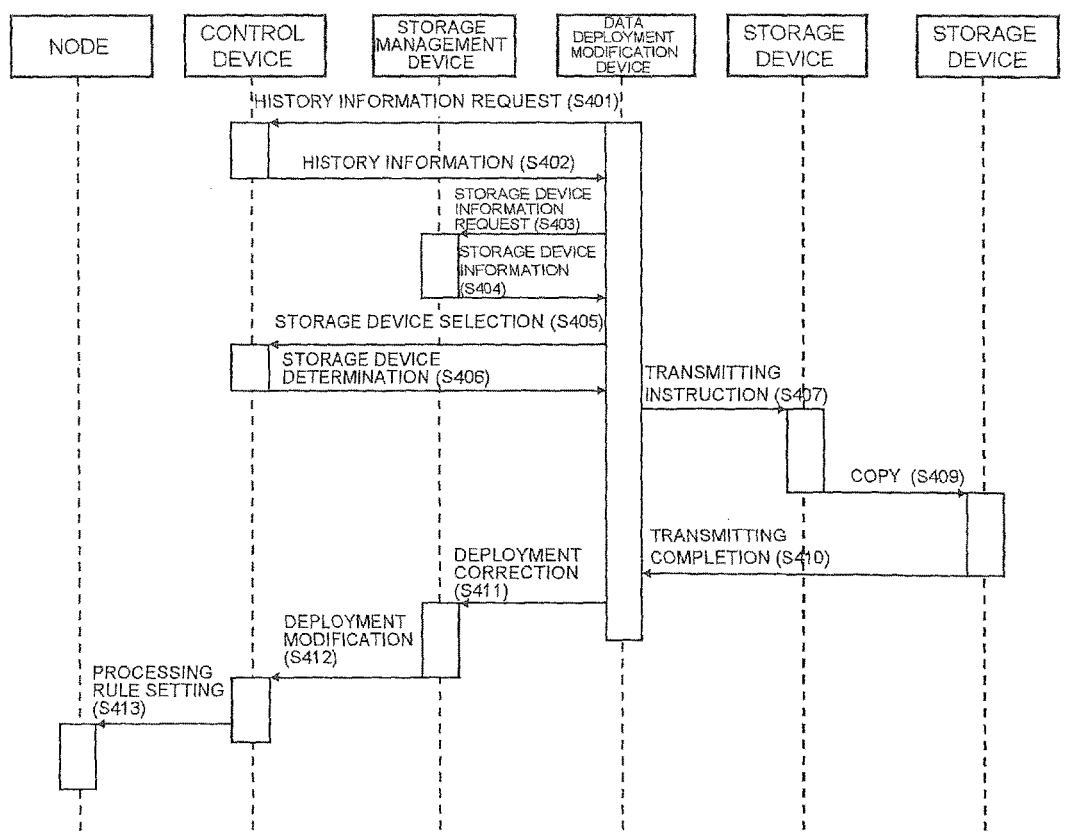
FIG. 18 is a sequence diagram representing another operation of the third exemplary embodiment of the present invention.

Furthermore, in the third exemplary embodiment described above, a description was given in which the object is copied via the data deployment modification device 60, but, as shown in FIG. 18, it is possible to employ a configuration in which data is directly copied between storage devices.

A description has been given above of preferable exemplary embodiments of the present invention, but the present invention is not limited to the abovementioned exemplary embodiments, and further modifications, substitutions and adjustments can be added, within a scope that does not depart from fundamental technological concepts of the invention. For example, in the exemplary embodiments described above, a description was given of application to object based storage devices, but general application is possible to other parallel file systems that are accessible via a network having forwarding nodes and a control device (controller).

A description has been given above of preferable exemplary embodiments of the present invention, but besides the storage system described above, the present invention can be applied also to various types of information system, as described above. It is to be noted that each disclosure of the abovementioned Patent Literature is incorporated herein by reference. Modifications and adjustments of exemplary embodiments are possible within the bounds of the entire disclosure (including the scope of the claims) of the present invention, and also based on fundamental technological concepts thereof. Furthermore, a wide variety of combinations and selections of various disclosed elements is possible within the scope of the claims of the present invention. That is, the present invention clearly includes every type of transformation and modification that a person skilled in the art can realize according to the entire disclosure including the scope of the claims and to technological concepts thereof.

Finally, preferred modes of the present invention are summarized. First of all, the "communication system" may be termed as "network system" in general.
(First Mode)

Refer to the communication system according to the first aspect described above. The first mode may be formulated as a network system comprising: a plurality of nodes each of which forwards a packet; a terminal device to establish a connection with at least one of the nodes, and to access a network through at least one of connected nodes; and a control device to control a packet forwarding route in response to a received request which is sent from at least one of connected nodes to request for setting the packet forwarding route. The control device may comprise: a first unit to store a plurality of location information respectively corresponding to the respective nodes; a second unit to receive the request for setting from at least one of connected nodes; and a third unit to identify a location of the terminal device based on the location information corresponding to at least one of nodes connected to the terminal device, and to control the packet forwarding route by using the location information of the terminal device.

(Second Mode)

The communication system in accordance with the first mode, wherein the control device, in a case of receiving the setting request from a prescribed node, identifies the location of the terminal device from the location information corresponding to the prescribed node, and controls a packet forwarding route by using the location of the terminal device.

(Third Mode)

The communication system in accordance with the first or second mode, wherein the control device refers to policy information indicating a restricting condition related to the packet forwarding route, determined based on respective location information of the plural nodes, and controls a packet forwarding route based on the location of the terminal device and the policy information.

(Fourth Mode)

The communication system in accordance with any one of the first to third modes, wherein the control device determines a server device to be connected based on, from plural server devices that are candidates for connection to the terminal device, respective locations of the plural server devices and the location of the terminal device, and controls a packet forwarding route between the terminal device and the determined server device.

(Fifth Mode)

The communication system in accordance with the fourth mode, wherein the control device determines a server device to be connected to the terminal device, based on cost required for access between the terminal device and the respective plural server devices.

(Sixth Mode)

The communication system in accordance with the fourth or fifth mode, wherein, when plural server devices that are candidates for connection to the terminal device are modified or the location of the terminal device is changed, the control device re-determines a server device to be connected to the terminal device, and controls a packet forwarding route from the terminal device to the re-determined server device.

(Seventh Mode)

The communication system in accordance with any one of the first to third modes, further comprising a plurality of storage devices, wherein the control device comprises: a unit that stores map information that manages data stored in the plurality of storage devices; a unit that determines a storage device to be connected to the terminal device, based on the map information and the location of the terminal device; and a unit that controls a packet forwarding route from the terminal device to the determined storage device.

(Eighth Mode)

The communication system in accordance with the seventh mode, wherein the control device comprises: a unit that stores a restricting condition related to access to the storage devices; a unit that determines a storage device to be connected to the terminal device, based on the map information, the location of the terminal device, and the restricting condition; and a unit that controls a packet forwarding route from the terminal device to the determined storage device.

(Ninth Mode)

The communication system in accordance with the seventh or eighth mode, further comprising a data deployment modification device to modify a storage device storing prescribed data, based on a state of access to the prescribed data by the terminal device.

(Tenth Mode)

The communication system in accordance with the seventh or eighth mode, comprising a data deployment modification device to determine a storage device newly storing prescribed data, based on a state of access to the prescribed data by the terminal device, and to replicate the prescribed data in the determined storage device.

(Eleventh Mode)

The communication system in accordance with the ninth or tenth mode, wherein the data deployment modification device selects a storage device based on cost required for access between the terminal device and the respective plural storage devices.

(Twelfth Mode)

Refer to the control device according to the second aspect described above. The twelfth mode may be formulated as a control device that receives a setting request for a packet forwarding route from at least one of a plurality of nodes each of which forwards a packet, and controls the packet forwarding route in response to the setting request, the control device comprising: a first unit to store a plurality of location information respectively corresponding to the respective nodes; a second unit to receive the setting request from at least one of nodes connected to a terminal device accessing a network; and a third unit to identify a location of the terminal device based on location information corresponding to the at least one of nodes connected to the terminal device, and to control the packet forwarding route by using the location of the terminal device.

(Thirteenth Mode)

The control device in accordance with the twelfth mode, wherein, in a case of receiving the setting request from a prescribed node, the location of the terminal device is identified from the location information corresponding to the prescribed node, and a packet forwarding route is controlled using the location of the terminal device.

(Fourteenth Mode)

The control device in accordance with the twelfth or thirteenth mode, wherein reference is made to policy information indicating a restricting condition related to the packet forwarding route, determined based on respective location information of the plurality of nodes, and the packet forwarding route is controlled based on the location of the terminal device and the policy information.

(Fifteenth Mode)

The control device in accordance with any one of the twelfth to the fourteenth modes, wherein determination is made of a server device to be connected based on, from plural server devices that are candidates for connection to the terminal device, respective locations of the plural server devices and the location of the terminal device, and a packet forwarding route between the terminal device and the determined server device is controlled.

(Sixteenth Mode)

The control device in accordance with the fifteenth mode, wherein a server device to be connected to the terminal device is determined based on cost required for access between the terminal device and the respective plurality of server devices.

(Seventeenth Mode)

The control device in accordance with the fifteenth or sixteenth mode, wherein, when plural server devices that are candidates for connection to the terminal device are modified, or when the location of the terminal device is changed, a server device to be connected to the terminal device is re-determined, and a packet forwarding route from the terminal device to the re-determined server device is controlled.

(Eighteenth Mode)

The control device in accordance with the any one of the twelfth to the fourteenth modes, further comprising: a unit that stores map information that manages data stored in a plurality of storage devices; a unit that determines a storage device to be connected to the terminal device, based on the map information and the location of the terminal device; and a unit that controls a packet forwarding route from the terminal device to the determined storage device.

(Nineteenth Mode)

The control device in accordance with the eighteenth mode, comprising a unit that stores a restricting condition related to access to the storage devices; a unit that determines a storage device to be connected to the terminal device, based on the map information, the location of the terminal device, and the restricting condition; and a unit that controls a packet forwarding route from the terminal device to the determined storage device.

(Twentieth Mode)

The control device in accordance with the eighteenth or nineteenth mode, comprising a data deployment modification unit to modify a storage device storing prescribed data based on a state of access to the prescribed data by the terminal device.

(Twenty-First Mode)

The control device in accordance with the eighteenth or nineteenth mode, comprising a data deployment modification unit to determine a storage device newly storing prescribed data, based on a state of access to the prescribed data by the terminal device, and replicates the prescribed data in the determined storage device.

(Twenty-Second Mode)

The control device in accordance with the twentieth or twenty-first mode, wherein the data deployment modification unit selects a storage device based on cost required for access between the terminal device and the respective plural storage devices.

(Twenty-Third Mode)

Refer to the communication method according to the third aspect described above.

(Twenty-Fourth Mode)

Refer to the program according to the fourth aspect described above.

It is noted that the entire disclosure of the original application based on whose priority is claimed is not affected by the added or modified disclosure entered on the later application (i.e., present international application) and should be interpreted based on the claimed priority date.

REFERENCE SIGNS LIST 10, 10A to 10D node
11 packet processing unit
12 flow entry storage unit
20 control device
21 node location information recording unit
22 path determination unit
23 path setting unit
24 communication unit
25 map information recording unit
26 network configuration storage unit
27 connection destination determination unit
28 history storage unit
30 terminal device
40 storage device
40B to 40D service providing device
50 storage management device
51 file meta information management unit
52 object deployment management table
60 data deployment modification device
61 deployment planning unit
62 data moving unit
100 network

What is claimed:

1. A communication system, comprising:
a plurality of nodes each of which forwards a packet;
a terminal device to establish a connection with at least one of the nodes, and to access a network through said at least one of connected nodes; and
a control device to control a packet forwarding route in response to a received request which is sent from said at least one of connected nodes to request for setting the packet forwarding route, the control device provides routing control based on location information of the terminal device without managing an address indicating the location information of the terminal device,
wherein said control device comprises:
a memory configured to store program instructions; and
a processor configured to execute the program instructions to:
store a plurality of location information respectively corresponding to the respective nodes;
receive the request for setting from said at least one of connected nodes; and
identify a location of said terminal device based on the location information corresponding to said at least one of nodes connected to said terminal device, and control the packet forwarding route by using the location information of said terminal device to connect said terminal device and a target node with an optimized packet forwarding route by the control device, the location information corresponding to said at least one of nodes including at least one of a logical location within the network of the plurality of nodes and a geographical location.

2. The communication system according to claim 1, therein
said control device, in a case of receiving the request for setting from a prescribed node, identifies the location of the terminal device from a location information corresponding to the prescribed node, and controls the packet forwarding route by using the location of the terminal device.

3. The communication system according to claim 1, wherein the control device
refers to policy information indicating a restricting condition related to the packet forwarding route, determined based on respective location information of the plurality of nodes, and
controls the packet forwarding route based on the location of the terminal device and the policy information.

4. The communication system according to claim 1, wherein said control device determines a server device to be connected based on, from plural server devices that are candidates for connection to said terminal device, respective locations of the plural server devices and the location of said terminal device, and controls the packet forwarding route between said terminal device and the determined server device.

5. The communication system according to claim 4, wherein said control device determines the server device to be connected to the terminal device, based on cost required for access between said terminal device and said respective plural server devices.

6. The communication system according to claim 4, wherein, when the plural server devices that are candidates for connection to the terminal device are modified or the location of said terminal device is changed, the control device re-determines a server device to be connected to said terminal device, and controls the packet forwarding route from said terminal device to the re-determined server device.

7. The communication system according to claim 1, further comprising a plurality of storage devices, wherein said control device comprises, the processor configured to execute the program instructions to:
store map information that manages data stored in the plurality of storage devices;
determine a storage device to be connected to said terminal device, based on the map information and the location of said terminal device; and
control the packet forwarding route from said terminal device to the determined storage device.

8. The communication system according to claim 7, wherein the control device comprises, the processor configured to execute the program instructions to:
store a restricting condition related to access to the storage devices;
determine the storage device to be connected to the terminal device, based on the map information, the location of said terminal device, and said restricting condition; and
control the packet forwarding route from said terminal device to the determined storage device.

9. The communication system according to claim 7, further comprising a data deployment modification device to modify the storage device storing prescribed data, based on a state of access to the prescribed data by said terminal device.

10. The communication system according to claim 9, wherein said data deployment modification device selects the storage device based on cost required for access between said terminal device and the respective plural storage devices.

11. The communication system according to claim 7, further comprising a data deployment modification device to determine the storage device newly storing prescribed data, based on a state of access to the prescribed data by said terminal device, and to replicate the prescribed data in the determined storage device.

12. The communication system according to claim 1, wherein
said control device determines whether or not a device to be connected to the tea a anal device is modified and controls, in a case of modifying the device, the packet forwarding route from said terminal device to the modified device.

13. The communication system according to claim 1, wherein the location information corresponding to said at least one of the plurality of nodes includes the logical location within the network of the plurality of nodes, the location of the terminal device is identified by the location information corresponding to the at least one of the connected nodes connected to the terminal device, and
wherein the processor is configured to execute the program instructions to connect the terminal device and the target node with the optimized packet forwarding route by using the identified location of the terminal device.

14. A control device that receives a setting request for a packet forwarding route from at least one of a plurality of nodes each of which forwards a packet, and controls the packet forwarding route in response to the setting request, said control device comprising:
a memory configured to store program instructions; and
a processor configured to execute the program instructions to:
store a plurality of location information respectively corresponding to the plurality of nodes;
receive the setting request from at least one of the plurality of nodes connected to a terminal device accessing a network; and
identify a location of said terminal device based on one of the location information corresponding to said at least one of nodes connected to said terminal device, and control the packet forwarding route by using the location of said terminal device to connect said terminal device and a target node with an optimized packet forwarding route by the control device, the location information corresponding to said at least one of nodes including at least one of a logical location within the network of the plurality of nodes and a geographical location,
wherein the control device provides routing control based on the location information of the terminal device without managing an address indicating the location information.

15. The control device according to claim 14, wherein, in a case of receiving the setting request from a prescribed node, the location of said terminal device is identified from a location information corresponding to the prescribed node, and the packet forwarding route is controlled using the location of said terminal device.

16. The control device according to claim 14, wherein
reference is made to policy information indicating a restricting condition related to the packet forwarding route, determined based on respective location information of said plurality of nodes, and
the packet forwarding route is controlled based on the location of said terminal device and the policy information.

17. The control device according to claim 14, wherein determination is made of a server device to be connected based on, from plural server devices that are candidates for connection to the terminal device, respective locations of the plural server devices and the location of said terminal device, and the packet forwarding route between the terminal device and the determined server device is controlled.

18. The control device according to claim 17, wherein the server device to be connected to said terminal device is determined based on cost required for access between said terminal device and the respective plurality of server devices.

19. The control device according to claim 17, wherein, when the plural server devices that are candidates for connection to said terminal device are modified, or when the location of said terminal device is changed, a server device to be connected to said terminal device is re-determined, and the packet forwarding route from said terminal device to the re-determined server device is controlled.

20. The control device according to claim 14, further comprising the processor configured to execute the program instructions to:
    store map information that manages data stored in a plurality of storage devices;
    determine a storage device to be connected to said terminal device, based on the map information and the location of said terminal device; and
    control the packet forwarding route from said terminal device to the determined storage device.

21. The control device according to claim 20, further comprising the processor configured to execute the program instructions to:
    store a restricting condition related to access to the storage devices;
    determine the storage device to be connected to said terminal device, based on the map information, the location of said terminal device, and the restricting condition; and
    control the packet forwarding route from said terminal device to the determined storage device.

22. The control device according claim 20, further comprising the processor configured to execute the program instructions to: modify the storage device storing prescribed data based on a state of access to the prescribed data by said terminal device.

23. The control device according to claim 22, further comprising the processor configured to execute the program instructions to: select the storage device based on cost required for access between said terminal device and the respective plural storage devices.

24. The control device according to claim 20, further comprising the processor configured to execute the program instructions to: determine DTI the storage device newly storing prescribed data, based on a state of access to the prescribed data by said terminal device, and to replicate the prescribed data in the determined storage device.

25. The control device according to claim 14, further comprising processor configured to execute the program instructions to:
    determine whether or not a device to be connected to the terminal device is modified; and
    control, in a case of modifying the device, the packet forwarding route from said terminal device to the modified device.

26. A communication method by a control device that receives a setting request for a packet forwarding route from at least one of a plurality of nodes each of which forwards a packet, and that controls the packet forwarding route in response to the setting request, the method comprising:
    receiving the setting request from at least one of the plurality of nodes connected to a terminal device that has access to a network,
    referring to location information corresponding to said at least one of the plurality of nodes connected to said terminal device, from a storage unit that stores respective location information of the plurality of nodes,
    identifying the location of said terminal device from the location information corresponding to said at least one of plurality of nodes referred to, and
    controlling the packet forwarding route using the location of said terminal device to connect said terminal device and a target node with an optimized packet forwarding route by the control device, the location information corresponding to said at least one of nodes including at least one of a logical location within the network of the plurality of nodes and a geographical location,
    wherein the control device provides routing control based on a location information of the terminal device without managing an address indicating the location information of the terminal device.

27. A non-transitory computer-readable storage medium storing a program to be executed in a control device that receives a setting request for a packet forwarding route from at least one of a plurality of nodes each of which forwards a packet, and controls the packet forwarding route in response to the setting request, the program executing:
    a process of receiving the setting request inquiry from at least one of the plurality of nodes connected to a terminal device that has access to a network,
    a process of referring to location information corresponding to said at least one of the plurality of nodes connected to said terminal device, from a storage unit that stores respective location information of the plurality of nodes,
    a process of identifying the location of said terminal device from the location information corresponding to said at least one of nodes referred to, and
    a process of controlling the packet forwarding route by using the location of said terminal device to connect said terminal device and a target node with an optimized packet forwarding route by the control device, the location information corresponding to said at least one of plurality of nodes including at least one of a logical location within a network of the plurality of nodes and a geographical location,
    wherein the control device provides routing control based on a location information of the terminal device without managing an address indicating the location information of the terminal device.

* * * * *